Dec. 15, 1970   R. W. DRUSHEL ET AL   3,548,257
ELECTRIC CIRCUIT START-UP PROTECTION METHOD AND STRUCTURE
Filed April 23, 1968   2 Sheets-Sheet 1

INVENTORS
ROBERT W. DRUSHEL
CARL R. ERICKSON
BY Whittemore,
Hulbert & Belknap
ATTORNEYS

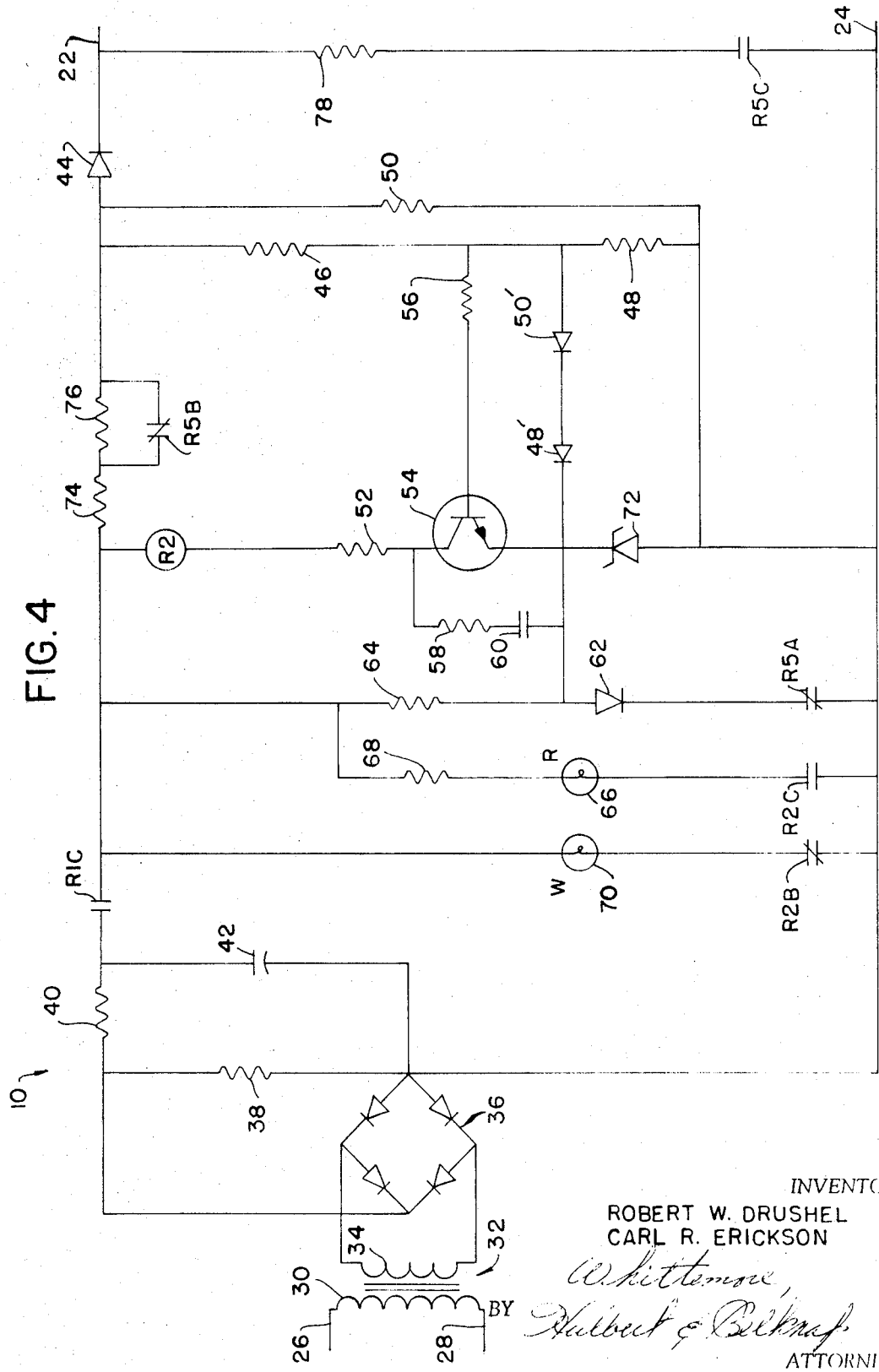

United States Patent Office 3,548,257
Patented Dec. 15, 1970

3,548,257
ELECTRIC CIRCUIT START-UP PROTECTION METHOD AND STRUCTURE
Robert W. Drushel, Farmington, and Carl R. Erickson, Redford Township, Wayne County, Mich., assignors to Ex-Cell-O Corporation, Detroit, Mich., a corporation of Michigan
Filed Apr. 23, 1968, Ser. No. 723,519
Int. Cl. H02h 7/00
U.S. Cl. 317—13                                 16 Claims

ABSTRACT OF THE DISCLOSURE

Structure for and a method of preventing an electrical machining circuit from closing when a short is present in the circuit is disclosed.

The method includes the steps of sensing a short in the electrical machining circuit prior to closing of the circuit and preventing closing of the electrical machining circuit so long as the short exists therein. Additional steps in the method of protecting the electrical machining circuit include applying an electric signal across a sensed short in the circuit sufficient to burn off minor shorts but not sufficient to harm an electrode or workpiece on sensing of the short, preventing closing of the electrical machining circuit after an initially sensed short therein has been removed until a separate circuit closing step is performed and opening the electrical machining circuit on sensing of a signal substantially above the signal required to prevent initial closing of the circuit due to a short therein with an electrolyte between the workpiece and electrode after closing of the electrical machining circuit and subsequent sensing of a short therein.

The structure provided for accomplishing the method of the invention includes a semiconductor, means for providing conduction through the semi-conductor when a short exists in the machining circuit and a circuit actuating relay connected in series with the semi-conductor across the electrical machining circuit, which relay includes contacts in the electrical machining circuit responsive to energizing of the relay through the semi-conductor to close the machining circuit. Structure is also provided for applying a reduced electric signal in the electrical machining circuit to burn off minor irregularities causing shorts after a short is sensed and for energizing a protective relay on energizing the circuit actuating relay, including contacts operable to prevent closing of the machining circuit closing contacts without a separate circuit closing step after an initial failure of the circuit actuating relay to close the machining circuit. A further signal level shifting relay is provided, including contacts operable on closing of the electrical machining circuit to place a Zener diode in series with the semi-conductor whereby the voltage necessary to maintain the semi-conductor in a conducting state is raised to cause breaking of the electrical machining circuit at a signal level substantially above that necessary to permit initial conduction of the semi-conductor representing a no-short condition in the machining circuit with an electrolyte between the workpiece and electrode.

BACKGROUND OF THE INVENTION

Field of the invention

The invention relates to electrical protection methods and circuits and refers more specifically to a method of and circuit for preventing closing of an electrical machining circuit or the like with a short in the circuit, for preventing subsequent closing of the electrical machining circuit on removal of the short thereacross without performing a separate circuit closing step and for opening the electric circuit at a signal substantially above that indicating a no short condition in the circuit with an electrolyte between the workpiece and electrode after the circuit has initially been closed.

Description of the prior art

In the past sophisticated methods of and circuits for protecting the machining circuit, workpiece and electrode during electrical machining and the like have been provided. See for example, the Drushel application, Ser. No. 595,442. filed Nov. 18, 1966. The circuits of the past have generally been operable only after the main electrical machining circuit has been placed in an operating condition. Thus, in for example electro-chemical machining, it has in the past been possible to close the machining circuit with the electrode and workpiece in a shorted condition which may ruin the electrode or workpiece or both.

In addition, in the past no means have been provided for preventing immediate completing of shorted protected circuits once the short is removed therefrom. Thus, it has been necessary in the past to turn off the power for the electrical machining circuit before attempting to remove a short occurring therein which might be due to a minor irregularity or misalignment capable of being corrected by minor adjustments of the workpiece or electrode. Turning off the machining circuit and repositioning the workpiece in an attempt to remove a short circuit by trial and error has in the past produced inefficient multiple handling steps which are eliminated or substantially reduced by the circuit of the invention.

Still further, in prior electrical machining control circuits and the like, structure for performing the steps of breaking a machining circuit at a voltage higher than required to initially close the machining circuit with an electrolyte between the workpiece and electrode on a short circuit occurring after initial closing of the machining circuit or burning off minor irregularities causing shorts after they have been sensed has not been provided. Such steps and structure are necessary to reduce machine set-up time and electrode and workpiece damage to a minimum on occurrence of a short circuit during operation of an electrical machining circuit.

SUMMARY OF THE INVENTION

In accordance with the invention there is provided a particularly simple, economical and efficient circuit for preventing closing of an electrical circuit for electrical machining or the like when a short is present is the circuit and for burning off minor irregularities causing shorts in the circuit. The circuit of the invention prevents closing of the electrical machining circuit without an operator performing a separate closing step if a short is initially sensed in the electrical machining circuit and is subsequently removed and produces breaking of the electrical machining circuit at a signal of predetermined voltage higher than the low voltage signal indicating a short in the electrical machining circuit on start-up when the electric cell between the workpiece and electrode is completed by an electrolyte after the electrical machining circuit has been closed, whereby rapid breaking of the electrical machining circuit is accomplished on a short occurring therein during operation thereof.

BRIEF DESCRIPTION OF THE DRAWINGS

FIG. 4 is a schematic diagram of a protection circuit for performing the method of the invention.

DESCRIPTION OF THE PREFERRED EMBODIMENT

Figure 1:
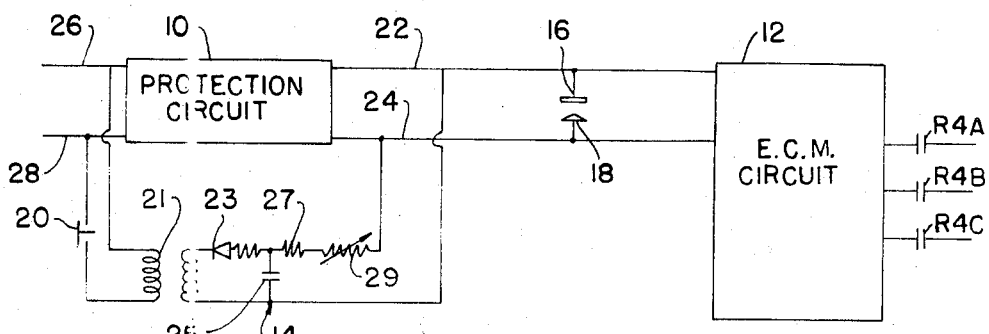
FIG. 1 is a block diagram of an electrical machining circuit including a short circuit safeguard unit or protection circuit constructed in accordance with the invention with a total burn-off circuit connected thereto.

An electrical circuit 10 or safeguard unit for protecting an electro-chemical machining circuit 12 is shown in FIG. 1 in combination with a total burn-off circuit 14. Each of the electro-chemical machining circuit 12, protection circuit 10 and burn-off circuit 14 are shown connected across a workpiece 16 and electrode 18.

In operation, with no short in the electro-chemical machining circuit 12, the relay contacts R4A, R4B and R4C are closed on a start cycle step being performed to energize the power supply 12 and produce electro-chemical machining in a known manner. However, if a short circuit exists in the electro-chemical machining circuit, as for example, when the workpiece and electrode 16 and 18 are in contact on start-up of the electro-chemical machining circuit 12, the protection circuit 10 will prevent closing of the relay contacts R4A, R4B and R4C until the short circuit has been removed.

If a short circuit has initially been sensed by the protection circuit 10, a second start cycle step must be performed before the relay contacts R4A, R4B and R4C can be closed after initial sensing of a short circuit in the electro-chemical machining circuit 12.

Further, the protection circuit 10 is operable to cause the relay contacts R4A, R4B and R4C to open at a predetermined voltage higher than the voltage indicating an initial short circuit in the electro-chemical machining circuit with the electric cell between the workpiece 16 and electrode 18 completed after the electro-chemical machining circuit has been completed.

The total burn-off circuit 14 may be actuated on closing the switch 20 to provide rectified voltage from transformer 21, through rectifier 23 across the filter including capacitor 25 and resistor 27 and through variable resistor 29, across the electrode and workpiece in the electro-chemical machining circuit 12 sufficient to burn off minor irregularities between the electrode and workpiece causing shorts. The voltage applied through the burn-off circuit 14 will be insufficient to damage any of the protection circuit 10, the workpiece 16, electrode 18 and the electro-chemical machining circuit 12.

Thus, in operation, it is possible to remedy some short circuit conditions on start-up of the electro-chemical machining circuit or thereafter, providing the short may be cured by placing a predetermined voltage across the short insufficient to damage the electro-chemical machining circuit, the workpiece 16 and the electrode 18 due to the provision of the burn-off circuit 14.

The electro-chemical machining circuit 12 is conventional and will not be considered in detail herein, except with reference to the relay contacts R4A, R4B and R4C which are required to be closed to energize the electro-chemical machining circuit 12.

The electrical protection circuit 10 is shown in more detail in FIG. 4. The circuit 10 is connected through conductors 22 and 24 across the workpiece 16 and electrode 18 in parallel with the electro-chemical machining circuit 12. Power is supplied to the electrical protection circuit 10 through the conductors 26 and 28 connected to the primary winding 30 of transformer 32 having secondary winding 34. The secondary winding 34 of transformer 32 is connected through a full wave bridge rectifier 36 to the filter circuit, including resistors 38 and 40 and the capacitor 42. On closing of the relay contacts R1C during initiation of a cycle of electro-chemical machining with the electro-chemical machining circuit 12, short circuit sensing power from the rectifier 36 is applied to the remaining portion of the electrical protection circuit 10.

The remaining portion of the electrical protection circuit 10 includes a diode 44 and the voltage divider including the resistors 46, 48 and 50 connected, as shown, across the conductors 22 and 24. A relay solenoid R2 is connected in series with a current limiting resistance 52 and a semiconductor 54 across the resistance 46 of the voltage divider which is in series with resistors 74 and 76 and the regulating diodes 48' and 50'. As shown, the base of the transistor semiconductor 54 is connected through the resistor 56 to one end of the resistor 46. Resistor 58 and capacitor 60 protect the transistor 54 from inductive transients that occur in the circuit 10 due to relay coil R2.

A diode 62 is connected to the emitter of the transistor 54 and to one side of the rectifier 36 through current limiting resistor 64 on one side thereof and is connected through the normally closed relay contacts R5A to the other side of the rectifier 36 on the other side thereof. A red indicator light 66 is connected in series with the resistor 68 and normally open relay contacts R2C across the resistance 64, diode 62 and normally closed contacts R5A, as shown in FIG. 4. A similar white indicator light 70 is connected across the rectifier 36 through the normally closed relay contacts R2B.

The Zener diode 72 is connected between the emitter of transistor 54 and the conductor 24 to provide a predetermined bias level necessary for conduction of the semi-conductor 54 after initial energizing of the relay coil R2 in operation as will be considered subsequently.

After the electro-chemical machining circuit 12 is energized, the relay contacts R5B are opened and contacts R5C are closed to vary the resistance including resistor 78 in parallel with the electrical protection circuit 10 across the electro-chemical machining circuit 12 and to vary the resistance including the resistors 74 and 76 in series between the diode 44 and relay contact R1C, as shown in FIG. 4.

Figure 3:
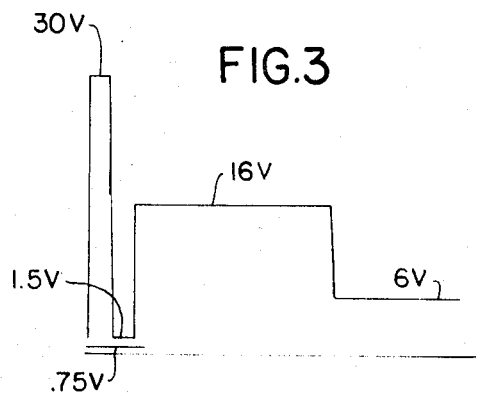
FIG. 3 is a graph useful in describing the operation of the protection circuit illustrated in FIG. 4 showing low and high, short sensing, voltages; machining voltage and subsequent cut off voltage.

In overall operation of the electrical protection circuit 10 a short circuit is first sensed by placing a high sensing voltage, such as 30 volts, between the workpiece and electrode with no electrolyte therebetween which reduces to a low voltage, such as 1.5 volts, when the electric cell between the workpiece and electrode is completed, as indicated in FIG. 3 providing the main rectifier is not yet on.

The resistance 78 is initially not placed across the electrical protection circuit since it is difficult to distinguish a short circuit across the electro-chemical machining circuit 12 from a non-shorted operating condition when the electrolyte is present between the workpiece and electrode, even with the resistance 78 initially in the circuit due to the various areas of electrodes and workpieces adjacent each other required in machining different configurations. Thus, the difference between a normal operating voltage between the workpiece 16 and electrode 18 may initially be in the order of one and one-half volts, while a poor condition or short circuit may indicate .75 volt or below, as illustrated in FIG. 3. However, the resistance 78 is desirable to stabilize the operation of the electro-chemical machining circuit 12 after it is completed and during a machining operation.

Figure 2:
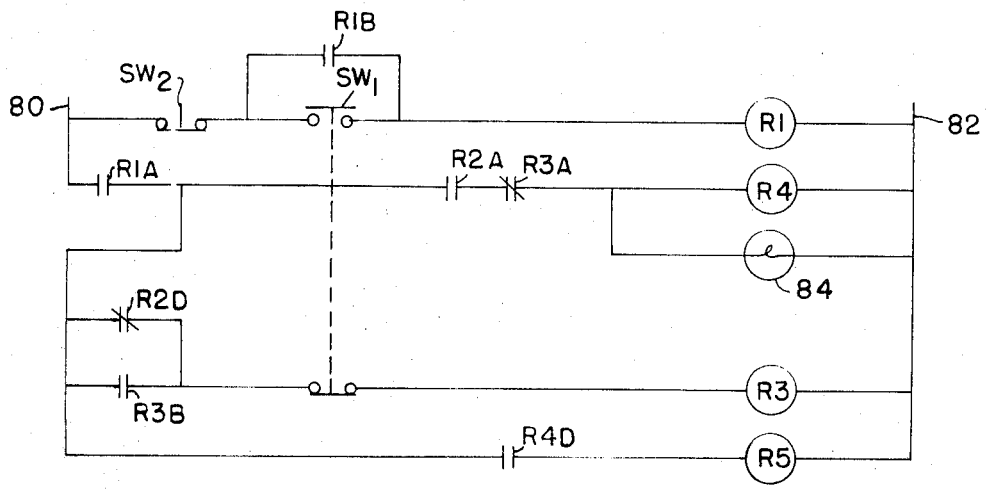
FIG. 2 is a simplified control circuit for the electrical machining circuit illustrated in FIG. 1.

With the resistors 76 and 78 initially disconnected in the protection circuit 10 by the contacts R5B and R5C, the contacts R1C will be closed on pressing of the start cycle switch SW1, illustrated in FIG. 2. Pressing of the switch SW1 in FIG. 2 will cause the relay coil R1 to be energized through the stop cycle switch SW2. Relay contacts R1A, R1B and R1C are closed in energizing the relay coil R1.

Relay contacts R1A connect the lower portion of the control circuit of FIG. 2 including the relay coils R3, R4 and R5 to a source of one hundred fifteen volts actuating energy (not shown) for the relays R1, and R3 through R5 over the conductors 80 and 82, illustrated in FIG. 2. Relay contacts R1B bypass the start cycle switch SW1 so that the actuating energy continues to energize the relay coil R1 after the switch SW1 is released and relay contacts R1C, as previously indicated, connect the power from the rectifier 36 to the electrical protection circuit 10.

The condition of the electro-chemical machining circuit 12 is sensed across the relay contacts R5A, diode 62, resistors 48 and 50, resistor 46 in parallel with resistors 48 and 50 and diode 44. If the voltage sensed between the emitter and base of transistor 54 due to the voltage across the conductors 22 and 24 is above that voltage indicative of a short circuit in the electro-chemical machining circuit, that is for example, above .75 volt, as shown in FIG. 3, the transistor 54 will be biased into conduction whereby the relay coil R2 is energized. Energizing the relay coil R2 closes the contacts R2A and opens contacts R2D in FIG. 2, opens the contacts R2B and closes the contacts R2C in FIG. 4.

Closing the contacts R2A in FIG. 2 provides energy through the normally closed contacts R3A, whereby the relay coil R4 is energized and contacts R4A, R4B, R4C and R4D are closed to cause the electro-chemical machining circuit 12 to be energized and electro-chemical machining to proceed in the usual manner. Closing of contacts R4D will energize relay R5 to open R5A and R5B and open R5C, the function of which will be considered subsequently. At this time the red indicator light 84 in the control circuit of FIG. 2 will indicate sensing power applied to the circuit 10 as well as machining power applied to circuit 12 in contrast to prior circuits in which the protection circuits are deenergized when the machining power is applied.

Opening contacts R2B causes the white indicator light 70 to be turned off after a momentary flash. The red indicator light 66 will be energized when contacts R2C are closed indicating power applied between the workpiece 16 and electrode 18.

Closing of the normally open relay contacts R4D at this time will energize relay R5, whereby relay contacts R5A and R5B are opened and relay contacts R5C are closed. As previously mentioned relay contacts R5B and R5C place resistor 76 in series between the resistor 74 and diode 44 in the electrical protection circuit 10 and place the resistor 78 in parallel with the electrical protection circuit 10 respectively. The changed circuit constants provide more stable and efficient operation of the electrical protection circuit 10 with the electro-chemical machining circuit 12 in operation.

The opening of the relay contacts R5A connects the emitter of the semi-conductor 54 to the conductor 24 through the Zener diode 72 rather than the diode 62 whereby the electrical signal across the electro-chemical machining circuit 12 necessary to maintain the semi-conductor 54 in a conducting state to energize the relay coil R2 is raised to, for example six volts which is substantially above the voltage necessary to cause initial conduction of the semi-conductor 54 connected to the conductor 24 through the diode 62.

Thus, as shown in FIG. 3, if after the electro-chemical machining circuit 12 has been energized through closing of the contacts R4A, R4B and R4C a short circuit develops, as for example between the workpiece 16 and electrode 18, the operating voltage which may be, for example sixteen volts, need only drop to the established value of, for example six volts regulated by the Zener diode 72 before the transistor 54 is cut off.

The operating voltage indicated as sixteen volts in FIG. 3, and the cut-off voltage indicated as six volts in FIG. 3 may be made substantially closer to each other when the operating characteristics of the electro-chemical machining circuit are known, so that cutting off of the electro-chemical machining circuit 12 may be very fast as, for example, within a half cycle of the power supplied thereto on development of a short circuit thereacross to prevent or minimize damage to the workpiece 16 and electrode 18.

Should a short circuit initially appear across the electro-chemical machining circuit 12 when the momentary start cycle switch SW1 is pressed, the voltage across the conductors 22 and 24 will be so low as not to cause conduction of the transistor 54, whereby the relay coil R2 will not be energized. The contacts R2A will therefore not be closed, the relay contacts R2B will not be opened and the relay contacts R2C will not be closed. Thus, the relay contacts R4A, R4B and R4C will not be closed since the relay coil R4 will not be energized. In addition, the white indicator light 70 will be on indicating that there is no cutting power across the workpiece 16 and electrode 18, although sensing power is still available. If the white light 70 is off, it indicates that no power is applied to the sensing circuit either.

Also, the relay contacts R2D will not be opened so that when the switch SW1 is released, the lower portion thereof will cause the relay coil R3 to be energized whereby the contacts R3A are opened and contacts R3B are closed. Contacts R3B tend to maintain the relay R3 energized until the start cycle switch SW1 is pressed a second time and as long as the relay coil R3 is energized the relay coil R4 cannot be energized even if the short in the electro-chemical machining circuit 12 is removed. Thus, power will not be applied to the electro-chemical machining circuit 12 due to closing of the contacts R4A, R4B and R4C if initially the transistor 54 does not conduct until the start cycle switch SW1 is pressed a second time after removing the short in the electro-chemical machining circuit 12.

There is therefore provided a safety feature in the electrical protection circuit 10 permitting, for example, physically moving the electrode or workpiece slightly when the white light 70 is on, indicating a shorted condition therebetween since power will not be applied in the electro-chemical machining circuit 12 until the start cycle switch SW1 is pressed a second time. In practice therefore, considerable jiggling of the electrode and workpiece to remove minor shorts therebetween is permissible without danger, whereby considerable time saving in removal of shorts between the electrode and workpiece is possible.

On pressing of the start cycle switch SW1 a second time, the circuit to the relay coil R3 is broken so that the contact R3A will return to its normally closed position to energize the electro-chemical machining circuit 12, as previously explained provided the short in the circuit has been removed as, for example, by means of the total burn-off circuit 14.

While one embodiment of the present invention has been disclosed in detail, it will be understood that other embodiments and modifications are contemplated. It is the intention to include all embodiments and modifications as are defined by the appended claims within the scope of the invention.

What we claim as our invention is:

1. Structure for preventing closing of a circuit such as an electrical cutting circuit when there is a short in the circuit comprising means connected to the circuit for sensing a short in the circuit prior to closing of the circuit including switching means connected in parallel with a portion of the circuit operable to change conditions on a short being initially present in the electrical cutting circuit and means responsive to the sensing means for preventing closing of the circuit when a short is sensed therein including a relay operable in response to the condition of the switching means.

2. Structure for preventing closing of a circuit such as an electrical cutting circuit with a short in the circuit comprising first means connected to the circuit for sensing a first signal of a first magnitude prior to closing of the circuit which signal indicates a short in the circuit and means responsive to the first sensing means for preventing closing of the circuit when a signal of the first magnitude is sensed therein prior to closing of the circuit and second means for sensing a second signal of a second greater magnitude in the circuit after the circuit is closed which second signal indicates a short in the circuit after initial closing of the circuit and means responsive to the second sensing means for opening the circuit when a signal of the second magnitude is sensed therein subsequent to closing of the circuit.

3. Structure as set forth in claim 2 and further including means operably associated with the means for preventing closing of the circuit for indicating the condition of closure of the circuit.

4. Structure as set forth in claim 3 and further including means operably associated with the means for preventing closing of the circuit when a short is sensed therein for preventing completing of the circuit after the short has been removed therefrom until a separate circuit closing step has been accomplished.

5. Structure for preventing closing of a circuit such as an electrical cutting circuit including a power supply and means for conducting electrical energy from opposite sides of the power supply to an electrode member and a workpiece with a short in the circuit between the electrode and workpiece comprising first normally open relay contacts in the circuit between one side of the power supply and one of the electrode and workpiece, a semi-conductor device having emitter, base and collector electrodes, the emitter and collector of which are connected across the power supply in parallel with the electrode and workpiece, a relay coil for actuating the relay contacts in series with the emitter collector circuit of the semi-conductor, voltage divider means connected across the power supply in parallel with the semi-conductor and means connecting the base and one of the emitter and collector of the semi-conductor to different points on the voltage divider whereby the semiconductor is energized only if no short appears across the electrode and workpiece and the relay coil is energized only when the semi-conductor is energized to close the relay contacts and the electrical cutting circuit.

6. Structure as set forth in claim 5 wherein the voltage divider initially includes a diode and second normally closed relay contacts in series with the semi-conductor across the power supply and further including a Zener diode connected in parallel with the diode and second contacts and means operable on closing of the first contacts with no short in the electrical cutting circuit for opening the second contacts whereby a different magnitude of voltage across the electrode and workpiece is required to energize the semi-conductor after the initial closing of the electrical cutting circuit with respect to the magnitude of electric signal required to energize the semi-conductor prior to closing of the electrical cutting circuit.

7. Structure as set forth in claim 6 and further including means for indicating initial closing of the first set of contacts and energizing the structure for preventing closing of a circuit with a short in the circuit comprising an indicator light connected across the power supply after the first set of contacts.

8. Structure as set forth in claim 7 and further including means for indicating actuation of the structure for preventing closing of a circuit with a short in the circuit comprising a second indicator light connected across the diode and second contacts and normally closed third contacts connected in series with the first indicator light and fourth normally open contacts connected in series with the second indicator light, which third and fourth contacts are opened and closed respectively on energizing of the relay coil in series with the semi-conductor.

9. Structure as set forth in claim 6 and further including means for placing additional resistance in the structure for preventing closing of a circuit having a short in the circuit on closing of the electrical cutting circuit to stabilize the operation of the structure for preventing closing of a circuit with a short in the circuit after closing of the electrical cutting circuit.

10. Structure as set forth in claim 6 and further including means operably associated with the means for preventing closing of the electrical cutting circuit when a short is sensed therein for preventing completing of the circuit after the short has been removed therefrom until a second closing step has been accomplished.

11. A method of protecting an electrical cutting circuit or the like comprising sensing a signal of a first predetermined magnitude present in the circuit before the circuit is completed which signal represents a short in the circuit when it is desired to complete the circuit and completing the circuit only if the signal of the first magnitude is not present, sensing the signal level in the circuit after the circuit has been completed and breaking the circuit when the signal level in the circuit falls to a second predetermined signal magnitude substantially above the first predetermined signal magnitude indicating a short in the circuit with the circuit closed.

12. The method as set forth in claim 11 and further indicating the condition of closure of the circuit.

13. The method as set forth in claim 11 and further including the step of preventing completion of the circuit on removal of a short therefrom after sensing a short therein until a separate circuit completing step is taken.

14. Structure as set forth in claim 1 and further including means operably associated with the means for preventing closing of the circuit for indicating the condition of closure of the circuit.

15. Structure as set forth in claim 1 and further including means operably associated with the means for preventing closing of the circuit when a short is sensed therein for preventing completing of the circuit after the short has been removed therefrom until a separate circuit closing step has been accomplished.

16. Structure as set forth in claim 1 and further including means operably associated with the means for sensing a short in the circuit for opening the circuit at a signal level substantially above the signal level at which an initial short in the circuit prevents closing of the circuit.

References Cited
UNITED STATES PATENTS

| | | | |
|---|---|---|---|
| 3,213,258 | 10/1965 | Ferguson | 219—69 |
| 3,259,795 | 7/1966 | Schierholt | 219—69CX |
| 3,328,279 | 6/1967 | Williams | 204—224 |

J D MILLER, Primary Examiner

H. FENDELMAN, Assistant Examiner

U.S. Cl. X.R.

204—143, 224; 219—69; 307—94